United States Patent [19]

Caramanian

[11] 4,153,743

[45] May 8, 1979

[54] CONCRETE SURFACE TREATING MATERIAL AND METHOD OF TREATING CONCRETE SURFACES

[76] Inventor: John A. Caramanian, 1021 Summer St., Cincinnati, Ohio 45204

[21] Appl. No.: 920,205

[22] Filed: Jun. 29, 1978

Related U.S. Application Data

[63] Continuation-in-part of Ser. No. 782,568, Mar. 29, 1977, Pat. No. 4,116,915.

[51] Int. Cl.$^2$ .................................................. B05C 1/16
[52] U.S. Cl. ............................... 427/136; 260/31.4 R; 260/31.4 EP; 260/32.8 EP; 260/33.2 EP; 260/33.6 EP; 260/830 S; 427/385 C; 427/386; 427/445; 428/413
[58] Field of Search ................... 427/386, 445, 385 C, 427/136; 260/830 S, 31.4 R, 31.4 EP, 32.8 EP, 33.2 EP, 33.6 EP; 428/413

[56] References Cited

U.S. PATENT DOCUMENTS

| | | | |
|---|---|---|---|
| 2,569,920 | 10/1951 | Buck et al. | 427/386 X |
| 2,657,153 | 10/1953 | Russell | 427/385 C |
| 3,161,114 | 12/1964 | Wittenwyler | 260/830 S X |
| 3,310,601 | 3/1967 | De Acetis et al. | 260/830 S X |
| 3,479,204 | 11/1969 | Lovelock et al. | 427/386 X |
| 3,689,305 | 9/1972 | Hausmann | 427/386 |
| 3,900,622 | 8/1975 | Caramanian | 427/445 |
| 4,091,148 | 5/1978 | Blankenhorn et al. | 427/386 X |

Primary Examiner—Ronald H. Smith
Assistant Examiner—Thurman K. Page
Attorney, Agent, or Firm—Edmund M. Jaskiewicz

[57] ABSTRACT

A concrete surface is treated with a low viscosity sealant solution comprising an epoxy resin and an organic elastomeric polysulfide curing component which solution penetrates deeply into the surface and fills voids therein.

8 Claims, No Drawings

CONCRETE SURFACE TREATING MATERIAL AND METHOD OF TREATING CONCRETE SURFACES

RELATED APPLICATION

This application is a continuation-in-part of the application filed Mar. 29, 1977 having Ser. No. 782,568 by same-named applicant, now U.S. Pat. No. 4,116,915.

The present invention relates to a method of treating concrete surfaces as described in U.S. Pat. No. 3,900,622 of John A. Caramanian, and more particularly to an improved sealing composition to render such surfaces wear, erosion and spall resistant. Utilizing the new and improved sealing composition in accordance with the present invention, as hereinafter described, all existing air pollution control laws are fully satisfied. The method is useful, furthermore, for application to prevent erosion of new concrete and to stop erosion of old concrete surfaces.

The principal object of this invention is to provide an improved sealant and method of protecting concrete surfaces utilizing a sealing composition which penetrates deeply i.e. $\frac{1}{4}$" to $\frac{3}{8}$ inches, into concrete surfaces and prevents erosion and spalling thereof due to freeze-thaw cycles.

A further object of this invention is to provide an elastomeric low viscosity sealing composition for treating concrete surfaces which greatly reduces the deleterious effect of water, gasoline, jet fuels, oil or grease on concrete surfaces, and renders the resultant treated concrete resistant to the attack of salt, calcium chloride, urea and the like deicing chemicals.

A still further object of this invention is to provide an epoxy resin sealing composition for treating concrete surfaces to render the same tough and wear resistant yet flexible enough to expand and contract with the concrete.

The invention is useful for the treatment of such concrete areas as runways, bridge decks, parking garages, sidewalks, curbing abutments, walkways, airport parking areas and highways.

The sealing composition preferably comprises two liquid components, (A) an epoxy resin base component and (B) an organic polysulfide modified curing and hardening agent. Both components comprise relatively low viscosity solutions, and when mixed during use provide a sealant solution which penetrates deeply into the concrete filling the voids and cavities therein. If desired, a single can or component sealing composition may be utilized, eliminating the need of mixing e.g. (A) and (B) components as described. In such a single component system a heat cure hardener is used instead of one which cures the epoxy resin at room temperature. A heat gun can be used for this purpose to cure the composition in situ during use.

Where the concrete treating composition comprises two components such as (A) and (B) as aforementioned, the hardener can be one which cures the epoxy resin at room temperature i.e. 72° F.

An example of this type of sealing composition for concrete surface treatment is as follows; the parts and percentages given are by weight unless otherwise stated:

Component A

| Parts | |
|---|---|
| 34.35 | Glycidel-ether modified 100% solids epoxy resin (Shell Epon 815) |
| 17.20 | Methyl ethyl ketone |
| 6.50 | Toluol |
| 8.92 | Butyl cellosolve (ethylene glycol mono-butyl ether) |
| 21.01 | Cellosolve acetate (ethylene glycol monoethyl ether acetate) |
| 6.37 | Cyclohexanone |
| 5.65 | Hi Initial VM&P Naphtha |
| 100.00 | |

Component B

| Parts | |
|---|---|
| 14.36 | Polysulfide elastomer (Thiokol polysulfide LP-3) |
| 3.92 | Diethylene triamine |
| 21.41 | Methyl ethyl ketone |
| 8.09 | Toluol |
| 11.11 | Butyl cellosolve (ethylene glycol mono-butyl ether) |
| 26.15 | Cellosolve acetate (ethylene glycol monoethyl ether acetate) |
| 7.93 | Cyclohexanone |
| 7.03 | Hi Initial VM&P Naphtha |
| 100.00 | |

The epoxy resin of component A can be the commercial product known as Shell Epon 815, a tradename of Shell Oil Company. This resin has a viscosity of about 5 to 7 poises at 25° C. and is approximately 100% solids. The solvent Hi Initial VM&P Naphtha can be the commercial aliphatic hydrocarbon solvent known by that tradename by Ashland Oil & Refining Company (Commercial Solvent Div.). This hydrocarbon solvent has a boiling range of 119°–137° C. and Sp.Gr. of 0.728 (60° F.) The organic polysulfide elastomer can be the commercial product known as Thiokol polysulfide LP-3, a tradename of Thiokol Chemical Company.

Components A and B can be prepared and stored until ready for use. When ready for use, equal parts by weight or volumes of components A and B are mixed together to form a mixed treating composition having a viscosity of not less than 9 nor more than 25 seconds as measured in a Number 4 Ford Cup at 75° F. For high density air entrained concrete, such as the type used in runways and bridge construction, the viscosity of the mixed sealant composition preferably is between 10 and 12 seconds. For other concrete surfaces the viscosity may range from 9 to 24 seconds depending upon the variations of the characteristics of the concrete. The mixed sealant composition consists of the following:

A and B Mixed Treating Sealant Composition

| Parts | |
|---|---|
| 34.35 | Glycidel-ether modified 100% solids epoxy resin (Shell Epon 815) |
| 14.36 | Polysulfide elastomer (Thiokol polysulfide LP-3) |
| 3.92 | Diethylene triamine |
| 38.61 | Methyl ethyl ketone |
| 14.59 | Toluol |
| 20.03 | Butyl cellosolve (ethylene glycol mono-butyl ether) |
| 47.16 | Cellosolve acetate (ethylene glycol monoethyl ether acetate) |
| 14.30 | Cyclohexanone |
| 12.68 | Hi Initial VM&P Naphtha |
| 200.00 | |

During use the mixed treating solution (A and B) is spread on the concrete surface with a brush or roller or may be sprayed on the concrete, preferably at a rate of approximately 1 gallon to 100–150 sq.ft. of concrete surface. The sealant, which comprises approximately 74% by weight solvent diluents, penetrates a substantial depth into the concrete, the depth of penetration varying somewhat with the consistency of the concrete e.g. penetration being about one-fourth to three-eighths inches as aforementioned, in highway concrete. The improvement of the present treatment over the composition described, and hereinafter referred to, is achieved by substantially reducing the content of butyl cellosolve and adding a relative large amount of methyl ethyl ketone solvent. A lower boiling naphtha solvent also is used instead of the higher boiling mineral spirits previously utilized. These changes improve the characteristic properties of the sealant. Both components A and B are low viscosity solutions which, when mixed, provides a low viscosity sealant composition that readily penetrates concrete surfaces and fills the voids. The two components are blended and thoroughly mixed just before use. Upon application of the sealant, such as by spray equipment, brush, roller, as aforementioned, or using a truck equipped with a spray bar, the resultant treated concrete surface preferably is cured for two or three days at room temperature (72° F.). Portland cement concrete surfaces treated with the sealant, in accordance with this invention, prevent spalling of the concrete, prevent scaling when tested in accordance with ASTM C 672 and satisfy all known test regulations as aforementioned. Storage stability of the two separate components remains stable when stored unmixed and tightly sealed for a period of six months or more from date of manufacture.

Application of the improved sealant to concrete surfaces, as hereinabove described result in providing better resistance to erosion and wear of the treated concrete than prior treatments. A significant improvement, as found by tests conducted with the new composition has shown that all existing air pollution control laws are fully satisfied e.g. the air pollution Rule 66 and Rule 3 "Formula Stop spall" as adopted for Los Angeles County in California, as well as that adopted by the state of Ohio, and similar air pollution regulations and rules as promulgated throughout the United States.

The resinous sealant mixture penetrates readily into the concrete filling the voids of the concrete as aforedescribed and protects the concrete against entry of water and the like foreign matter. The elastomer allows the resin to expand or stretch within the voids and cavities of the concrete filling the same without separating or peeling from the wall cavities.

In the examples given, a glycidyl-ether modified epoxy resin is set out, but other epoxy resins may be used, for example, the epoxy resins as manufactured by the Celanese Company and sold under the tradename EPI-Rez. In addition, as will be appreciated, other epoxy resins substitutions may be made e.g. using the Reichhold Co. line of resins marketed under the tradename EPOTUF. Other resins having an epoxide equivalent of 175–205, as preferred, or a resin having an epoxide equivalent of a minimum of 175 to a maximum of 225 may be substituted for the epoxy resin described in practicing this invention. Likewise, other polysulfide elastomers may be used, such as are compatible with the resin and solvents and are not water soluble. Other curing compounds or agents may be substituted for diethylene triamine e.g. triethylene tetramine. Also the EPI Cure series products produced and tradenamed by Celanese Company of Louisville, Kentucky, may be used. Further, curing compounds as made by Reichhold Chemicals under the tradename EPOTUF series 37–629 may be substituted in varying amounts for diethylene triamine.

Where a single can or component system is desired, as heretofore mentioned, the mixed treating sealant composition may be stored at low temperatures e.g. below 40° F., and preferably 0° F. prior to use to preclude pre-curing or hardening of the sealant composition before use. Such a single component mixture preferably may contain a heat cure hardener i.e. heat curing at temperatures above room temperature. In such single can sealing composition the sealant is applied to the concrete and heat cured in situ, as with the aid of a heat gun. For this purpose, for example, boron trifluoride may be used as a hardener and which effects a heat cure of the resinous composition when heated from 93° C. to 117° C. for a few minutes. Higher temperatures may be applied using heater means to accelerate the curing operation. Using the trifluoride hardener, the proportionate amount of hardener to epoxy resin comprises from 1–5 parts hardener to 100 parts of epoxy resin. Other heat cure hardeners may be used e.g. phthalic anhydride which requires a heat cure of from 120° to 140° C. depending upon the proportionate amount of hardener used.

The sealant composition for treating concrete surfaces, in accordance with this invention preferably comprises 20 to 30% solids content and 70 to 80% solvent content, and broadly comprises 25 to 40 parts epoxy resin, 10 to 20 parts organic polysulfide elastomer which is compatible with the epoxy resin, 40 to 50 parts ethylene glycol monoethyl ether acetate, 15 to 25 parts ethylene glycol mono-butyl ether, 30 to 45 parts of methyl ethyl ketone, the remainder of the composition comprising additional solvent diluents, the composition having a viscosity of 9 to 24 seconds measured with a Number 4 Ford Cup.

Further, referring to the requirements for treating concrete surfaces by the state of Ohio, and particularly the supplemental specification 852, a penetrating epoxy sealing treatment is therein specified. The specification requires the use of two liquid components, likewise as described above, an epoxy resin based component and a polysulfide modified curing component. Both components are low-viscosity solutions, clear amber in color, which when mixed and applied penetrate concrete surfaces and fill the voids.

Tests conducted, as described in the aforementioned U.S. patent, on samples of concrete treated with the sealant of this invention showed there was a substantial improvement in the protection afforded the thus treated concrete as compared with prior treating solutions.

It will be understood that this invention is susceptible to modification in order to adapt it to different usages and conditions, and accordingly, it is desired to comprehend such modifications within this invention as may fall within the scope of the appended claims.

What is claimed is:

1. A sealant composition for treating concrete surfaces consisting essentially of the following components: 25 to 40 parts epoxy resin, 10 to 20 parts of organic polysulfide elastomer which is compatible with the epoxy resin, 40 to 50 parts ethylene glycol monoethyl ether acetate, 15 to 25 parts ethylene glycol monobutyl ether, 30 to 45 parts of methyl ethyl ketone, the remainder of the composition comprising additional solvent diluents, and wherein the composition has a viscosity of 9 to 24 seconds measured with a Number 4 Ford Cup.

2. A sealant composition for treating concrete surfaces as in claim 1 wherein the approximate content of the components set out therein is 35 parts epoxy resin, 15 parts organic polysulfide elastomer, 47 parts ethylene glycol monoethyl ether acetate, 20 parts ethylene glycol mono-butyl ether, and 40 parts methyl ethyl ketone with the remainder comprising said additional solvent diluents.

3. A sealant composition for treating concrete surfaces as in claim 1 wherein the solvent diluents approximate 70 to 80% by weight of the sealant composition, with solids comprising 20 to 30%.

4. A sealant composition for treating concrete surfaces as in claim 1 wherein a hardener is included for curing the epoxy resinous composition.

5. A sealant composition for treating concrete surfaces as in claim 4 wherein the hardener is heat cured at a temperature above room temperature.

6. A sealant composition for treating concrete surfaces as in claim 5 wherein the hardener is boron trifluoride.

7. A sealant composition for treating concrete surfaces as in claim 6 wherein the composition is a single component mixture.

8. A method of treating a concrete surface which comprises applying to the surface a sealant solution consisting essentially of 25 to 40 parts of an epoxy resin, 10 to 20 parts of an organic polysulfide elastomer which is compatible with the epoxy resin, 40 to 50 parts of ethylene glycol monoethyl ether acetate, 15 to 25 parts of ethylene glycol monobutyl ether, and 30 to 45 parts of methyl ethyl ketone diluent, and the remainder comprising additional solvents, the parts being by weight and the solution having a viscosity of 9 to 24 seconds measured with a Number 4 Ford Cup, and heat curing the sealant following its application.

* * * * *